Oct. 23, 1956
A. TURAK
2,767,737
GANG DISPENSING VALVE
Filed Oct. 8, 1952
2 Sheets-Sheet 1
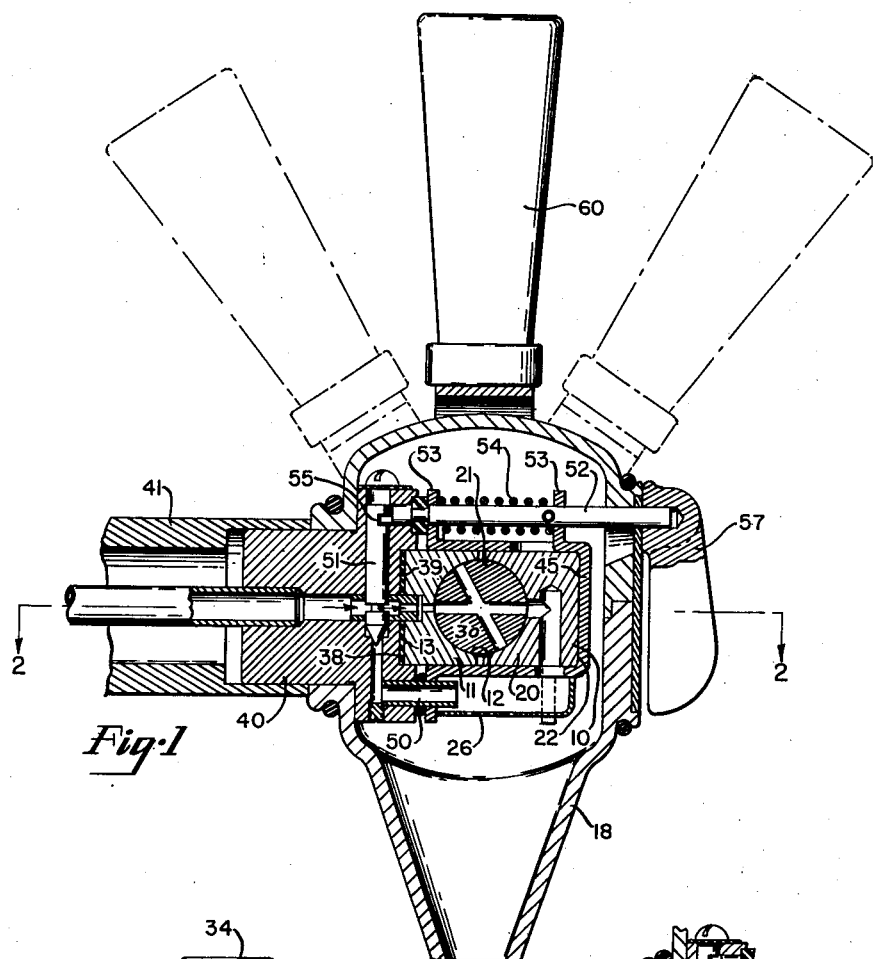
Fig.1
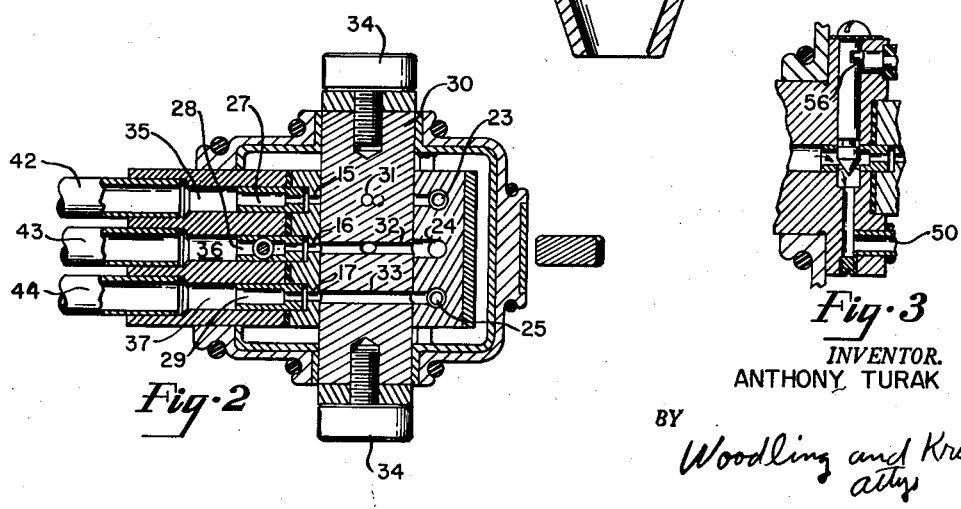
Fig.2
Fig.3
INVENTOR.
ANTHONY TURAK
BY Woodling and Kroet
attys

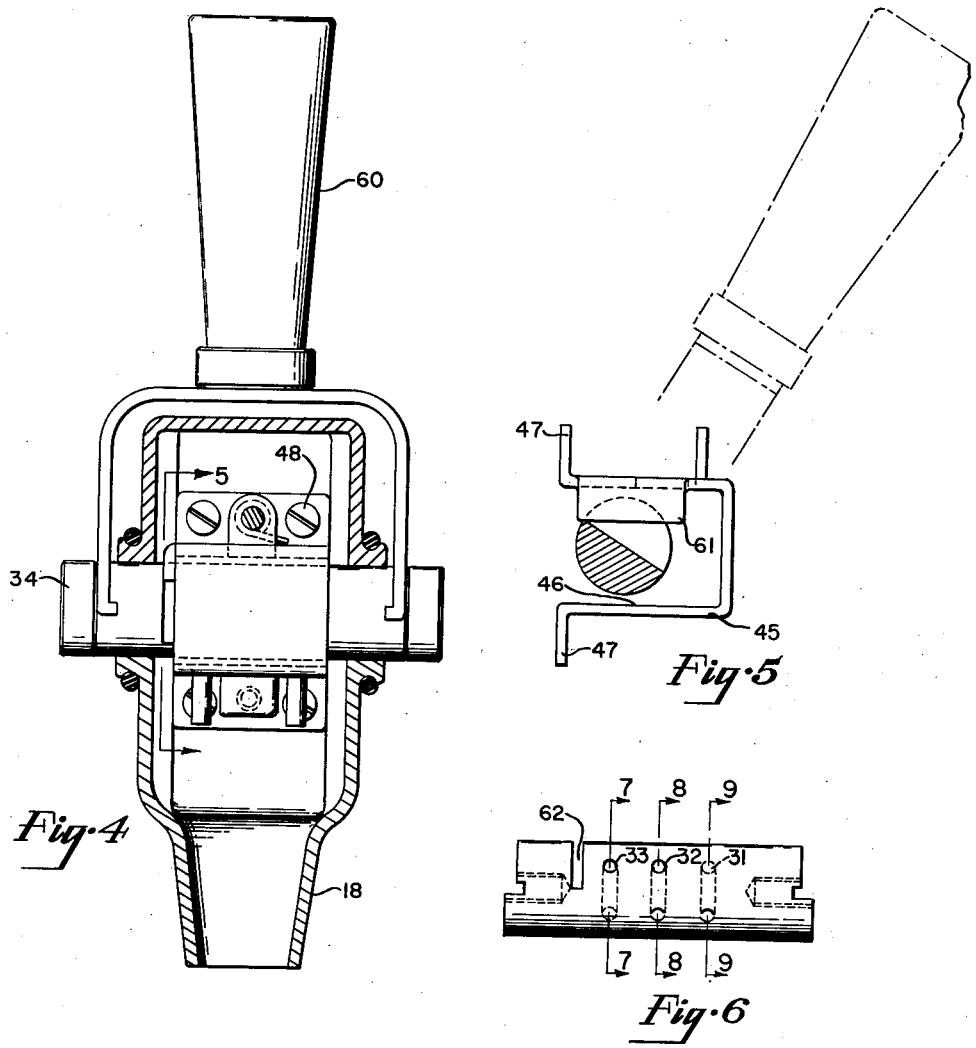

United States Patent Office 2,767,737
Patented Oct. 23, 1956

2,767,737

GANG DISPENSING VALVE

Anthony Turak, Cleveland, Ohio

Application October 8, 1952, Serial No. 313,626

4 Claims. (Cl. 137—599)

This invention relates generally to valve structures, and relates specifically to a dispensing and mixing valve for sirup concentrates and carbonated water.

An object of this invention is to provide a dispensing and mixing valve for two or more different kinds of soft drinks, or plain carbonated water.

Another object of this invention is to provide a gang valve structure of separable parts held together by external pressure.

Another object of this invention is to provide a gang faucet construction which may be dismantled, cleaned, or repaired, and rebuilt with a minimum of time and effort.

Still another object of this invention is to provide a gang faucet for mixing concentrates and soda water, with a by-pass valve to tap off plain soda water.

And another object of this invention is to provide a gang valve construction which needs a minor degree of precision construction and can be adjusted to compensate for wear.

Other objects and a fuller understanding of the invention may be had by referring to the following description and claims, taken in conjunction with the accompanying drawings, in which:

Figure 1 is a side view in section of an improved gang valve embodying the features of this invention;

Figure 2 is a section taken along line 2—2 of Figure 1;

Figure 3 is an enlarged fragmentary view of the by-pass valve for dispensing plain soda water;

Figure 4 is a front view of the gang valve, the housing being broken away to view the structure thereof;

Figure 5 is a sectional view through the fluid directing valve member of the faucet, and a side view of the clamp housing used to press the valve parts together, taken along line 5—5 of Figure 4, and showing the control handle in dot-dash lines in a maximum position;

Figure 6 is a front view of the fluid distributing valve member; and

Figures 7, 8, and 9 are sections taken as indicated from Figure 6.

Although the actual construction of a gang faucet embodying the principles of this invention may vary according to individual requirements, the construction illustrated in the drawings is the preferred embodiment for general use. The drawings illustrate a gang faucet of conventional appearance enclosed within a suitable housing 18. The invention relates, however, to the mechanical structure within the housing.

The mixing and dispensing mechanism is indicated by the reference character 10. Referring principally to Figure 1 of the drawings, the gang faucet comprises a first valve body 11. One face of the first valve body 11 is substantially entirely defined by a semi-cylindrical groove surface 12. The surface opposite the groove surface 12 is indicated by the reference character 13.

A second valve body 20 appears substantially identical to valve body 11 and is provided with a groove surface 21. The surface of valve body 20 opposite the groove surface 21 is indicated by the reference character 22. Valve bodies 11 and 20 are positioned with the groove surfaces thereof facing and defining a cylindrical guideway. The valve bodies do not quite touch one another in defining the true cylindrical guideway in order that there will be no possibility of contacting between the valve bodies to transmit pressure from one valve body directly to the other.

A cylindrical valve member 30 is mounted between the valve bodies 11 and 20 and is thereby rotatable within the guideway defined by the groove surfaces 12 and 21. It has been discovered that the first and second valve bodies 11 and 20 may preferably be made of cast nylon in order to eliminate the necessity of using a packing to prevent leakage of fluids between the mating surfaces of the grooves 12 and 21 and the cylindrical member 30. By compressing the first and second valve bodies together upon the cylindrical member, an operative dispensing valve structure is accomplished without the need of auxiliary packing and guiding mechanisms.

In adapting the basic portion of this invention to practical use, a bracket 41 is provided to extend from a wall or cabinet or other suitable base to which the dispensing faucet may be physically secured. Bracket 41 may be a length of pipe with a suitable base flange thereon. A member 40, which may be referred to as a base member, is fitted into the end of the bracket 41. The base 40 presents a forward seating surface 39 toward which the surface 13 of valve body 11 may be urged. A plurality of fluid conduits 42, 43, and 44 lead from the exterior of the base member into corresponding passageways 35, 36, and 37 through the base member 40. The conduits preferably extend through the pipe bracket 41 in order to remain hidden from view.

In the first valve body 11, fluid passageways 15, 16, and 17 extend from the exterior of the valve body 11 to the groove surface 12. In the illustrated embodiment these passageways open in the surface 13 and are spaced to register with the passageways 35, 36, and 37 passing through the base member 40. Short locating conduit sections 27, 28, and 29 form a continuation of passageways 35, 36, and 37 and project beyond the seating surface 39, and therefore the first valve body 11 may be impinged upon these conduits 27, 28, and 29 and form a liquid tight seal and properly locate the valve body 11. A gasket 38 is positioned between surfaces 13 and 39 in order to remove the necessity of precision fit.

The second valve body is provided with fluid passageways 23, 24, and 25 extending from the groove surface 21 to the exterior of valve body 20. As illustrated in Figure 1 of the drawings, the passageways 23-25 turn at right angles with respect to the longitudinal axis of the cylindrical valve member 30 and thereby direct fluid passing through these passageways downwardly.

The valve member 30 is set forth best in Figures 6 through 9. There are a plurality of fluid passageways 31, 32, and 33 through the valve member 30; and it may be seen by reference to the Figure 6 and the sectional view 7—9 that each of these fluid passageways has an entrance opening angularly spaced along the surface of the valve member 30 with respect to one another in a predetermined pattern for registering a selected number of the fluid passageways in the valve bodies 11 and 20 and conducting fluid under pressure through the valve. Movement of the valve member 30 into various selected positions will alternately block off all of the fluid passageways or connect a selected pair of the passageways as desired. The fluid passageway 32, as shown in Figure 8, is X-shaped and, therefore, has one portion thereof aligned with one of the passageways 31 or 33. Therefore, when the valve member 30 is turned to register the passageway 33 with the supply and exhaust conduits in the first and second valve bodies, one leg of passageway 32 will register with the fluid conduit 43. Likewise, when passageway 31 is aligned with conduit 42, the leg of passageway 32 will be aligned with conduit 43.

The improved valve construction of this invention is desirable because of the fact that it can be easily assembled and disassembled for cleaning or repairing and also because it may be easily adjusted to compensate for wear between the valve member 30 and the valve bodies 11 and 20. A yoke 45 is provided to embrace valve bodies 11 and 20, the valve member 30, and to hold them together under a predetermined pressure and prevent leakage, and also to assure the proper degree of tightness for the assembly. An interior cup 46 is defined by yoke 45 to hold the valve assembly. Note, however, that the surface 13 of valve body 11 projects beyond the cup 46. Yoke 45 is provided with flanges 47 thereon as best illustrated in Figure 5 of the drawings. Bolts or screws 48 extend through the flanges 47 and threadably engage the base member 40. Consequently, the screws 48 may be tightened to a selected degree to clamp the body member 11 and 20 together upon the valve member 30 and urge the entire assembly toward the seating surface 39 on base 40 and thereby impinge the locating conduits 27, 28, and 29 into the passageways 15-17 of the first valve body 11. The degree of tightness can therefore be readily adjusted by the operator to produce a fluid tight seal between the valve bodies and the valve member and to produce a degree of resistance to movement of the control handle to suit his own desire.

The valve member 30 is rotated between selected positions by means of a suitable handle 60 which spans the housing 18 and engages the ends of the valve member 30 as illustrated in Figures 2 and 4 of the drawings. Thumb screws 34 hold the handle 60 engaged into the valve member 30.

A convenient stop mechanism has been provided whereby the operator can move the handle 60 until a positive stopping position is felt and thereby assure proper position of the handle and alignment of the conducting passageways. In Figures 5 and 6 of the drawings there is illustrated a slot 62 in the valve member 30. The yoke 45 is provided with a down-turned tab 61 adapted to extend into the slot 62. The dimensions of the slot 62 and the tab 61 are arranged to bring about a contact between the bottom of the slot 62 and the edge of the tab 61 in the exact position which causes alignment of the various passageways 31-33 through the valve member with their co-operating supply and exhaust passageways in the valve bodies 11 and 20.

Previous valve constructions have been designed to dispense two mixed beverages and one unmixed beverage from three supply lines by providing three active dispensing positions for the handle 60 plus a neutral position. Such valves normally lack the positive stop positions which applicant has provided by the slot 62 and the tab 61. Nevertheless, in many instances, such as for use in taverns, it is desirable to have a gang faucet which will dispense two carbonated beverages or plain soda water. For use in soda fountains, one carbonated beverage, diffused soda, and a high pressure soda stream is needed. In the drawings the fluid conduit 43 may be referred to as a conduit supplying carbonated water. Therefore, from conduit 43, as best illustrated in Figure 3 of the drawings, there has been provided a by-pass passageway 50 to the diffusing basket 26. This is for tavern use. For soda fountain use, the passageway 50 would go to a nozzle projecting downwardly to provide a stream. A needle valve 51 extends through the conduit 43 and into the entrance to passageway 50 and thereby prevents flow of fluid through passageway 50 whenever it is pressed downwardly as illustrated in Figure 1. Flow of fluid through the passageway 50 is provided by lifting the needle valve 51 as illustrated in Figure 3.

An exterior control separate from the control of the valve member 30 is provided in order that there will be no need for a definite dispensing position for the handle 60. The preferred embodiment of the control for dispensing fluid through passageway 50 comprises a lateral control rod 52 with a bell crank 55 on the end thereof engaged into a recess 56 in the needle valve 51. Bearing guide tabs 53 are provided on the yoke 45 to guide the control rod 52. A torsion spring 54 encompasses a portion of the control rod 52 and urges the control rod into a position wherein the bell crank 55 is normally in the lower-most position illustrated in Figure 1 to thereby hold the needle valve 51 fitted tightly into the entrance of passageway 50. A finger grip handle 57 it attached to the end of control rod 52 and is positioned on the front surface of the housing 18 to thereby provide a convenient lever by which the operator may rotate the control rod 52 against the urge of torsion spring 54 and thereby lift the needle valve 51 and cause fluid to flow from fluid conduit 43 through the passageway 50 and thereby bypass the valve member 30.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A gang faucet comprising a supporting base member, a seating surface on said base member, a first rigid valve body having first and second oppositely disposed side surfaces, a semi-cylindrical groove in the first side surface, said second side surface adapted to mate with said seating surface, fluid passageways extending from the second side to said groove, a second rigid valve body having first and second oppositely disposed side surfaces, a semi-cylindrical groove in the first side surface of said second valve body, fluid passageways from the groove in the second valve body to the exterior thereof to a common mixing area, a cylindrical valve member engaged in said semi-cylindrical grooves of the first and second valve bodies, said cylindrical valve member having fluid passageway means with entrance ends angularly spaced along the surface of the valve member in a predetermined pattern for interconnecting a selected number of said passageways of the first and second valve bodies dependent upon the rotative position of the valve member, said seating surface of said base member having fluid supply nozzles projecting therefrom spaced to register with the fluid passageways of the first valve body, and holding means to press the first and second valve bodies with the valve member therebetween together as a unit toward said supporting base member, said holding means impinging said first valve body upon said supply nozzles and maintaining substantially equal the pressure of said valve member on each of said valve bodies and the pressure of said first valve body on said seating surface.

2. Liquid routing means for a gang faucet, comprising, a base member, said base member having a seating surface for a valve body, a plurality of fluid conduits leading from the exterior of said base member to said seating surface, a pressure clamp housing having an interior cup, means urging said pressure clamp housing toward said seating surface, a first and a second valve body member each having a semi-cylindrical surface groove, said first and second valve body members held in said interior cup of the clamp housing with the said surface grooves thereof facing and defining a cylindrical guide, a plurality of passageways through said first valve body member each having an entrance opening and an exit opening, means to interconnect the entrance opening of each passageway of the first valve body member with a fluid conduit at the said seating surface, said exit opening being in the face of the surface groove thereof, a plurality of passageways through said second valve body member from the face of the surface groove thereof to the exterior thereof, a cylindrical valve member rotatably mounted fluid-tight in said cylindrical guide and extending out of said interior cup, a plurality of fluid passage means defined by said valve mmeber, said passage means having entrance ends angularly spaced along the surface of said valve member in a predetermined pattern for registering a selected number of said fluid passage means with a selected number of passageways in any one predetermined rotative position of said valve member, said first and second valve body members with the valve member therebetween being pressed toward the seating surface and clamped together by the pressure clamp, whereby any wear may be compensated as it occurs.

3. A gang faucet comprising, a first rigid valve body having first and second oppositely disposed side surfaces, a semi-cylindrical groove in the first side surface, fluid passageways extending from the second side to said groove, a second rigid valve body having first and second oppositely disposed side surfaces, a semi-cylindrical groove in the first side surface of said second valve body, fluid passageways from the groove in the second valve body to the exterior thereof to a common mixing area, a cylindrical valve member engaged in said semi-cylindrical grooves of the first and second valve bodies, said cylindrical valve member having fluid passageway means with entrance ends angularly spaced along the surface of the valve member in a predetermined pattern for interconnecting a selected number of said passageways of the first and second valve bodies dependent upon the rotative position of the valve member, a supporting base member having fluid supply nozzles projecting therefrom spaced to register with the fluid passageways of the first valve body, means to press the first and second valve bodies with the valve member therebetween together as a unit toward said supporting base and to maintain substantially equal the pressure of said valve member on each of said valve bodies and impinge said first valve body upon said supply nozzles, first lever handle means to rotate said valve member to a selected valve position, a by-pass valve in one of said fluid supply nozzles, fluid conduit means from said by-pass valve to said common mixing area, and second lever handle means to selectively open said by-pass valve and dispense fluid from said one fluid supply nozzle independently of the position of the valve member.

4. Liquid routing means for a gang faucet, comprising, a base member, said base member having a seating surface for a valve body, a plurality of fluid conduits leading from the exterior of said base member to said seating surface, a pressure clamp housing having an interior cup, means urging said pressure clamp housing toward said seating surface, a first and a second valve body member each having a semi-cylindrical surface groove, said first and second valve body members held in said interior cup of the clamp housing with the said surface grooves thereof facing and defining a cylindrical guide, a plurality of passageways through said first valve body member each having an entrance opening and an exit opening, means to interconnect the entrance opening of each passageway of the first valve body member with a fluid conduit at the said seating surface, said exit opening being in the face of the surface groove thereof, a plurality of passageways through said second valve body member from the face of the surface groove thereof to the exterior thereof to a common mixing area, a cylindrical valve member rotatably mounted fluid-tight in said cylindrical guide and extending out of said interior cup, a plurality of fluid passage means defined by said valve member, said passage means having entrance ends angularly spaced along the surface of said valve member in a predetermined pattern for registering a selected number of said fluid passage means with a selected number of passageways in any one predetermined rotative position of said valve member, said first and second valve body members with the valve member therebetween being pressed toward the seating surface and clamped together by the pressure clamp, whereby any wear may be compensated as it occurs, first lever handle means to rotate said valve member to a selected valve position, a by-pass valve in one of said fluid conduits, fluid conduit means from said by-pass valve to said common mixing area, and second lever handle means to selectively open said by-pass valve and dispense fluid from said one fluid conduit independently of the position of the valve member.

References Cited in the file of this patent

UNITED STATES PATENTS

| | | |
|---|---|---|
| 53,627 | Kilgore | Apr. 3, 1866 |
| 1,584,600 | Black | May 11, 1926 |
| 2,349,978 | Miller | May 30, 1944 |
| 2,557,289 | Housekeeper | June 19, 1951 |

FOREIGN PATENTS

| | | |
|---|---|---|
| 275,427 | Great Britain | of 1927 |
| 724,177 | France | of 1932 |
| 21,322 | Australia | of 1935 |